United States Patent
Lee

(10) Patent No.: US 6,885,848 B2
(45) Date of Patent: Apr. 26, 2005

(54) APPARATUS FOR PREVENTING LOSS OF PORTABLE TELEPHONE USING A BLUETOOTH COMMUNICATION PROTOCOL AND CONTROL METHOD THEREOF

(75) Inventor: John-Gy Lee, Kyongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 500 days.

(21) Appl. No.: 09/726,685

(22) Filed: Nov. 30, 2000

(65) Prior Publication Data

US 2001/0002211 A1 May 31, 2001

(30) Foreign Application Priority Data

Nov. 30, 1999 (KR) ......................................... 1999-53953

(51) Int. Cl.⁷ ................................................. H04B 7/00
(52) U.S. Cl. .................. 455/41.2; 455/41.3; 455/556.2; 455/575.1; 455/85; 455/426.1; 455/552.1; 455/569.1; 455/556.1; 455/553.1; 455/557; 379/114
(58) Field of Search ............................... 455/41.2, 41.3, 455/426.1, 85, 556.1, 556.2, 575.1, 569.1, 551, 552.1, 553.1, 557, 566, 569; 379/114

(56) References Cited

U.S. PATENT DOCUMENTS

| | | | | |
|---|---|---|---|---|
| 5,373,548 A | * | 12/1994 | McCarthy | 455/462 |
| 5,422,931 A | * | 6/1995 | Austin-Lazarus et al. | 455/553.1 |
| 5,488,359 A | * | 1/1996 | Faris et al. | 340/7.52 |
| 5,590,417 A | * | 12/1996 | Rydbeck | 455/575.2 |
| 5,635,897 A | | 6/1997 | Kuo | |
| 5,642,413 A | * | 6/1997 | Little | 379/374.02 |
| 5,878,354 A | * | 3/1999 | Hasegawa | 455/567 |
| 5,930,724 A | * | 7/1999 | Yanagida | 455/575.1 |
| 6,078,825 A | * | 6/2000 | Hahn et al. | 455/569.2 |
| 6,160,489 A | * | 12/2000 | Perry et al. | 340/7.6 |
| 6,233,002 B1 | * | 5/2001 | Shibayama | 348/14.05 |
| 6,263,218 B1 | * | 7/2001 | Kita | 455/567 |
| 6,377,818 B2 | * | 4/2002 | Irube et al. | 455/556.1 |
| 6,424,820 B1 | * | 7/2002 | Burdick et al. | 455/41.1 |
| 6,477,378 B1 | * | 11/2002 | Halminen | 455/450 |
| 6,650,871 B1 | * | 11/2003 | Cannon et al. | 455/41.2 |

FOREIGN PATENT DOCUMENTS

| | | |
|---|---|---|
| EP | 0 581 416 A1 | 2/1994 |
| FR | 2768249 A | 3/1999 |
| GB | 2314188 A | 12/1997 |
| GB | 2315898 A | 2/1998 |
| GB | 2318673 A | 4/1998 |
| WO | WO 97/48083 | 12/1997 |

* cited by examiner

Primary Examiner—Marceau Milord
(74) Attorney, Agent, or Firm—Dilworth & Barrese LLP

(57) ABSTRACT

Disclosed is an apparatus for preventing the loss of a portable telephone using a bluetooth communication and the control method thereof capable of preventing the loss of the portable telephone. According to the control method, the portable telephone periodically measures a power level of a radio frequency received from an earphone when a loss prevention mode is determined, and detects a calling state between the portable telephone and the earphone. The portable telephone transmits a warning signal data to the earphone if the power level of the radio frequency received from the earphone is below a predetermined level in a state that the calling state between the portable telephone and the earphone is detected. The earphone generates a warning sound if the warning sound signal is received from the portable telephone during a bluetooth radio communication with the portable telephone.

9 Claims, 4 Drawing Sheets

APPARATUS FOR PREVENTING LOSS OF PORTABLE TELEPHONE USING A BLUETOOTH COMMUNICATION PROTOCOL AND CONTROL METHOD THEREOF

BACKGROUND OF THE INVENTION

1. Field of the Invention

The present invention relates generally to a short-range radio communication terminal using a transceiver capable of communicating using a bluetooth protocol, and more particularly to an apparatus for preventing the loss of a portable telephone utilitizing a bluetooth communication protocol and the control method thereof which can prevent the loss of the portable telephone.

2. Description of the Related Art

Mobile telephones are continually being developed that are smaller, less expensive to manufacture and operate and offer more functions and services. Accordingly, mobile telephones have become increasingly popular and their use is increasing.

However, even though the conventional portable telephone provides a radio communication function and other diverse functions, the telephone has no function for warning the user of its impending loss.

The absence of any loss warning feature is felt most in mobile telephones that communicate with a plurality of small earphones equipped with a transceiver capable of communicating using a bluetooth communication protocol. Thus the portable telephone or earphones may be lost if user is not careful.

SUMMARY OF THE INVENTION

Accordingly, it is an object of the present invention to provide an apparatus and method for preventing the loss of a portable telephone capable of using a bluetooth communication protocol.

In order to achieve the above and other objects of the present invention, there is provided a control method for preventing the loss of a portable telephone that may use a bluetooth communication protocol. The method comprises the steps of periodically measuring a power level of a radio frequency received from an earphone when a loss prevention mode is determined in the portable telephone, detecting a calling state between the portable telephone and the earphone, transmitting a warning sound signal to the earphone if the power level of the radio frequency received from the earphone is below a predetermined level when a state that the calling state between the portable telephone and the earphone is detected, and the earphone generating a warning sound if the warning sound signal is received from the portable telephone during radio communication with the portable telephone.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, the term "bluetooth" may refer to a short-range radio communication device replaces wired or infra-red communication devices in a short-range area, and communicates using the bluetooth protocol.

Figure 1:
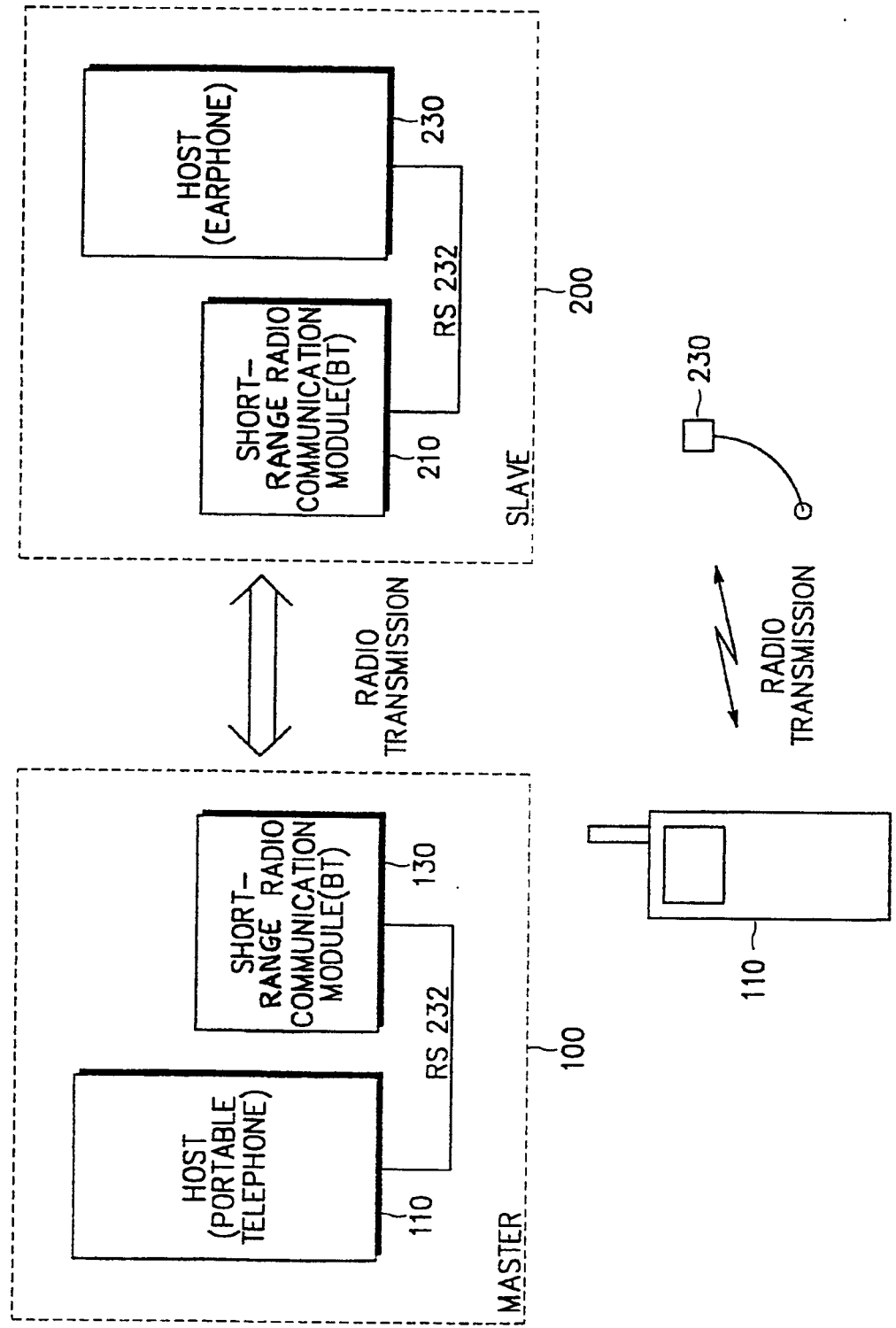
FIG. 1 is a schematic diagram illustrating the construction of an apparatus for preventing the loss of a portable telephone using a bluetooth communication protocol according to an embodiment of the present invention.

FIG. 1 is a schematic diagram illustrating the construction of a short-range radio communication system according to an embodiment of the present invention. Referring to FIG. 1, the communication system is comprised of a master communication system 100 and a slave communication system 200, slave communication system 200 is typically comprised of an earphone 230 having a hands-free function. Specifically, in order to effect a mutual short-range radio communication, the master communication system 100 is comprised of a portable telephone 110 and a first short-range radio communication (hereinafter referred to as BT) module 130 mounted in the portable telephone 110. The slave communication system 200 is composed of the earphone 230 and a second BT module 210 connected to the earphone 230.

Figure 2:
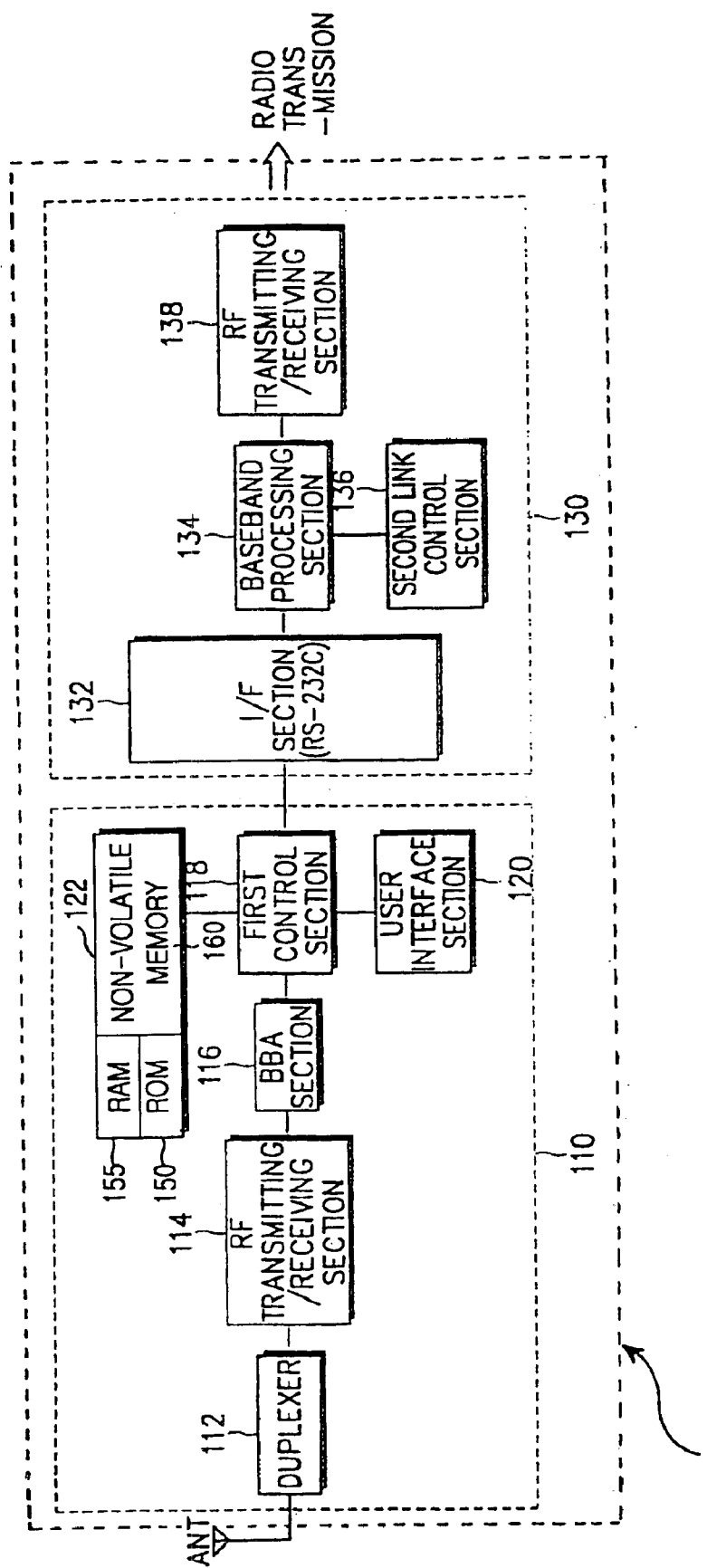
FIG. 2 is a block diagram of a master communication system 100 of FIG. 1.

Hereinafter, the detailed construction of elements constituting the master communication system 100 and the slave communication system 200 will be explained with reference to FIGS. 2 and 3. First, FIG. 2 is a block diagram of the master communication system 100 of FIG. 1. Referring to FIG. 2, BT module 130, which is a constituent element of the master communication system 100, comprises a radio frequency (RF) transmitting/receiving section 138, a baseband processing section 134 connected to RF transmitting/receiving section 138, a second link control section 136 connected to baseband processing section 134, and an interface section 132 (hereinafter referred to as I/F) connected to baseband processing section 134. The baseband processing section 134 and the second link control section 136 are connected to a first control section 118 of the portable telephone 110 through a host control interface (HCI), and transmit/receive control commands, resultant data, and user data by transmitting/receiving HCI packets. An RS232C, USB, or standard PC interface may be used as the HCI, and the HCI packet is divided into a command packet, event packet, and data packet. The command packet provides diverse commands for display of received characters according to the present invention.

The RF transmitting/receiving section 138 modulates the data packet produced from baseband processing section 134 to a predetermined frequency band for radio transmission, amplifies, and transmits the modulated data packet. In addition, the RF transmitting/receiving section 138 amplifies a received signal of a predetermined frequency band with its noise component maximally suppressed, lowers the frequency band of the received signal to a lower frequency band, and applies the lowered frequency signal to the baseband processing section 134.

The baseband processing section 134 converts the HCI data packet received from first control section 118 of the lost portable telephone into a packet format by adding an access code and header thereto. Baseband processing section 134 also converts the converted packet format into a predetermined data packet for radio transmission, and radio-transmits the data packet with a predetermined frequency band through the RF transmitting/receiving section 138. In addition, the baseband processing section 134 converts a received data packet into an HCI packet, and transmits the converted HCI packet to the first control section 118.

The first link control section 136 controls BT module 130 in accordance with a command from the command packet applied from the first control section 118 of the portable telephone, and transmits, in the form of an HCI packet, a request and resultant information of the slave communication system 200 inputted from the baseband processing section 134 to the first control section 118 of the host.

Meanwhile, the portable telephone 110 is provided with the first control section 118, a memory 122 and a user interface section 120 both connected to first control section 118, a baseband analog (BBA) section 116 also connected to first control section 118, an RF transmitting/receiving section 114 connected to BBA section 116 and a duplexer 112. A receiving part of RF transmitting/receiving section 114 amplifies a desired signal with its noise component maximally suppressed, and converts the amplified signal into a digital signal. This digital signal is analyzed and processed in the first control section 118. A transmitting part of the RF transmitting/receiving section 114 modulates the signal produced from the first control section 118 to a desired frequency band, amplifies and transmits the modulated signal to an antenna through duplexer 112.

The first control section 118 of the portable telephone 110 controls the whole operation of the portable telephone 110, and radio-transmits received information (character information, graphic information, etc.) to the slave communication system 200 using the bluetooth protocol.

The memory 122 comprises a ROM 150 wherein a program and control data required for controlling the portable telephone are stored, a non-volatile memory 160 for storing therein telephone numbers, names, etc., and a RAM 155 for temporarily storing therein data produced during the control of the program.

The user interface section 120 comprises a key input section provided with numeral keys for dialing and keys for setting various kinds of functions, and a display section for displaying the operation state of the portable telephone.

The BBA section 116 down-converts the IF signal to a baseband signal, and converts an analog baseband signal into a digital form in association with the receiving part. Also, the BBA section 116 converts digital data into a baseband signal, and converts the baseband signal into an IF signal in association with the transmitting part.

The duplexer 112 receives a radio signal of the frequency band from the antenna, and outputs the radio signal to the receiving part of the RF transmitting/receiving section 114. Also, the duplexer 112 receives a transmission signal from the transmitting part of the RF transmitting/receiving section 114, and outputs the transmission signal of the transmission frequency band through the antenna.

Figure 3:
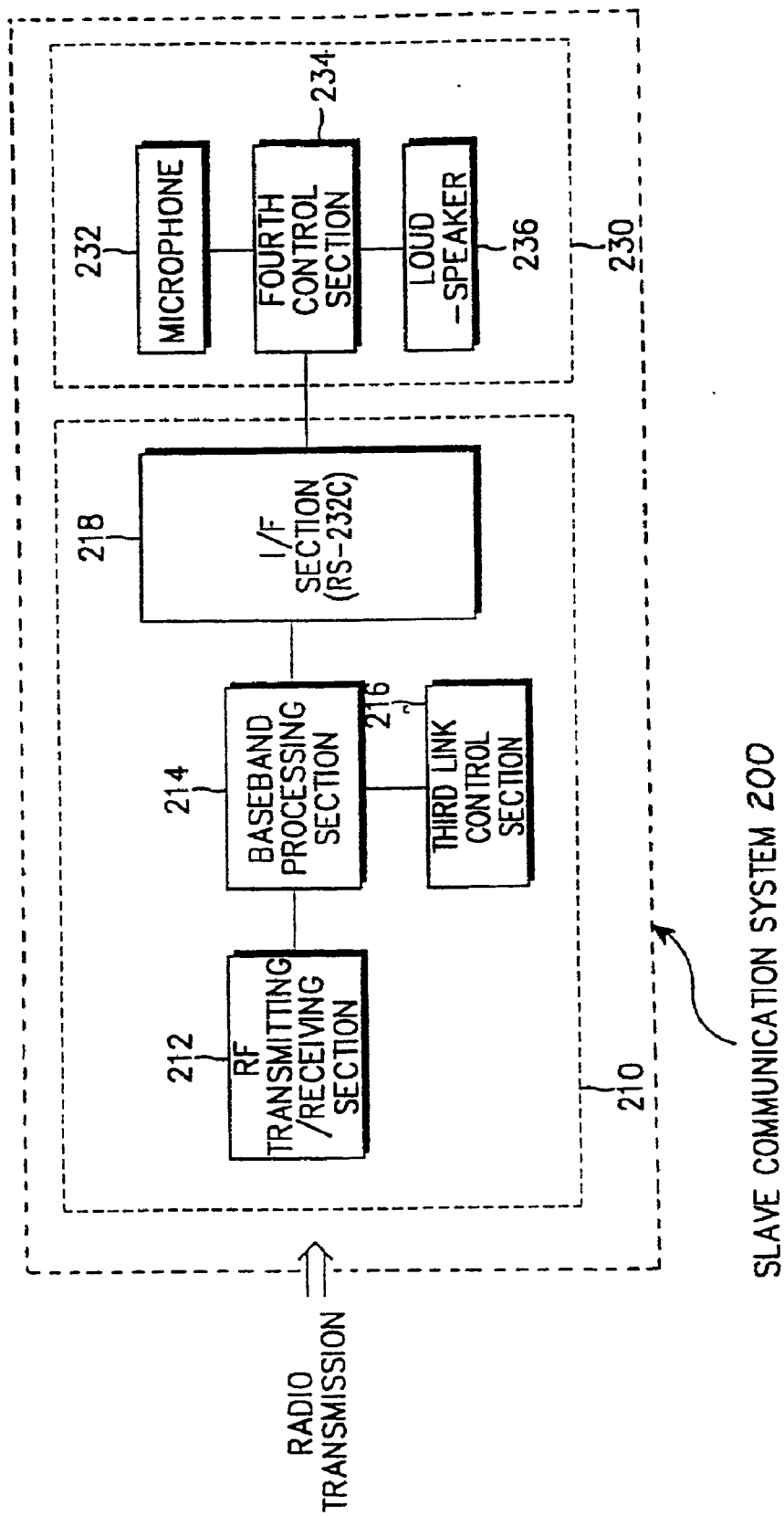
FIG. 3 is a block diagram of a slave communication system 200 FIG. 1.

Meanwhile, FIG. 3 is a block diagram of a slave communication system 200 illustrated in FIG. 1. The BT module 210 of the slave communication system 200 also comprises an RF transmitting/receiving section 212, a baseband processing section 214, a third link control section 216, and an I/F section 218 and is constructed the same as the BT module 130 of the master communication system 100. Thus, detailed explanation thereof will be omitted. The earphone 230, which is the host of the slave communication system 200, comprises a fourth control section 234 connected to both a microphone 232, and a loudspeaker 236. The fourth control section 234 converts data inputted from the microphone 232 into the HCI packet, and transmits the HCI packet to the BT module 210. Also, the fourth control section 234 receives the HCI packet provided from the BT module 210, and processes the received HCI packet.

The process of outputting information received in the portable telephone 110 to the loudspeaker 236 using the BT modules 130 and 210 mounted in the master communication system 100 and the slave communication system 200, i.e., the portable telephone 110 and the earphone 230, will now be explained with reference to FIG. 4.

Figure 4:
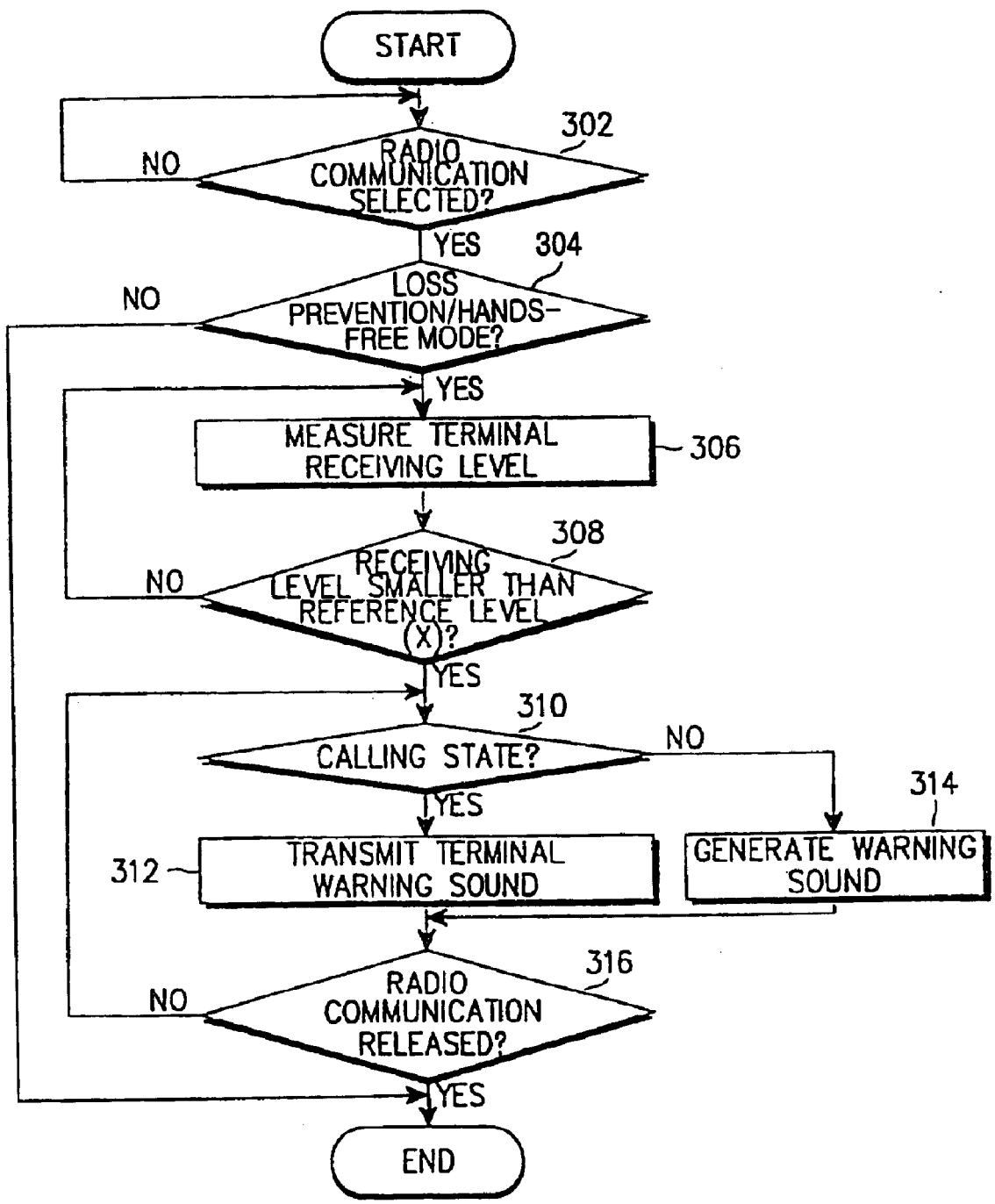
FIG. 4 is a flowchart illustrating the process of transmitting/receiving information between master communication system 100/slave communication system 200 in the apparatus for preventing the loss of a portable telephone using a bluetooth communication protocol according to the embodiment of the present invention.

FIG. 4 is a flowchart illustrating the process of transmitting/receiving information between the master communication system 100/slave communication system 200 as shown in FIGS. 2 and 3 and generating a warning sound accordingly. Referring to FIGS. 1 to 4, the method of generating a warning sound for preventing the loss of the portable telephone using a bluetooth enabled earphone according to the present invention will now be explained in detail.

First, step 302 determines, via first control section 118 of the portable telephone 110, whether short-range radio communication is selected through the user interface section 120. If so, the process proceeds to step 304, wherein first control section 118 determines whether a loss prevention mode and a hands-free mode are selected. If the loss prevention mode and the hands-free mode are selected at step 304, the process proceeds to step 306. If neither have been selected, the process ends. Here, the hands-free mode means a mode determined to perform a telephone call using the earphone 230, and may be determined by a hands-free mode determining key provided in the key input section of the portable telephone 110 or when the power of the earphone 230 is turned on.

If the loss prevention mode or the bands-free mode is determined in step 304, the first control section 118 controls the short-range radio communication module 130 to establish a baseband connection with the earphone 230 and then proceeds to step 306. Step 306 periodically checks the RF power level of the earphone 230 which is received through the short-range radio communication module 130 of the portable telephone. Then, step 308 determines whether the measured RF power level of the earphone 230 is less than a predetermined level (i.e., X level). In the embodiment of the present invention, the predetermined level corresponds to a receiving level that the portable telephone 110 receives from the earphone 230 when the distance between the portable telephone 110 and the earphone 230 is about 10 meters.

If the power level of the earphone 230 is less than the predetermined level at step 308, the first control section 118 proceeds to step 310 to determine whether the portable telephone is in a calling state. At this time, if the portable telephone is in the calling state, the process proceeds to step 312 to convert the warning sound control signal into a warning sound data packet through the short-range radio communication module 130 and to transmit the warning sound data packet to the earphone 230. Upon the completion of step 312, step 316 determines whether the short-range radio communication is released through the user interface section 120, and if so, it terminates the above-described process.

If it is determined that the portable telephone is not in the calling state at step 310, the first control section 118 proceeds to step 314 to generate the warning sound and then proceeds to step 316.

As described above, according to the apparatus for preventing the loss of a portable telephone using a bluetooth communication protocol and the control method thereof according to the present invention, the receiving power level of the earphone is periodically measured to detect whether the earphone is separated from the portable telephone over a predetermined distance in a loss prevention mode or hands-free mode of the portable telephone employing the bluetooth enabled earphone. If it is detected that the earphone is separated from the portable telephone by more than the predetermined distance, a warning sound is generated in the earphone, thereby preventing the loss of the portable telephone.

While this invention has been described in connection with what is presently considered to be the most practical and preferred embodiment, it is to be understood that other modifications thereof may be made without departing from the scope of the invention. Thus, the invention should not be limited to the disclosed embodiment, but should be defined by the scope of the appended claims and their equivalents.

What is claimed is:

1. An apparatus for preventing the loss of a portable telephone, comprising:
   a master communication system provided by said portable telephone and having a first short-range radio communication module and a first control section; and
   a slave communication system provided by a wearable earphone which includes a speaker and a microphone to facilitate hands-free communication, and having a second short-range radio communication module, wherein said first control section transmits a warning sound signal to the slave communication system to generate a specified warning sound when said first control section determines that a distance between the master communication system and the slave communication system is greater than a predetermined range.

2. The apparatus as claimed in claim 1, wherein said master communication system generates said specified warning sound when said first control section determines that the distance between the master communication system and the slave communication system is greater than said predetermined range and there exists a state that no radio communication is established between the master communication system and the slave communication system.

3. The apparatus as claimed in claim 1, wherein the master communication system and the slave communication system perform radio communications according to a BLUETOOTH communications protocol.

4. A control method for preventing the loss of a portable telephone while a user of the portable telephone wears an earphone which includes a speaker and a microphone that facilitate wireless operation of the portable telephone in a hands-free mode the method comprising the steps of:
   periodically measuring a power level of a radio frequency received from a short range communication module included in the earphone when a loss prevention mode is determined in the portable telephone;
   determining whether a calling state exists between the portable telephone and the earphone;
   transmitting a warning sound signal to the short range communication module of the earphone if the power level of the radio frequency received from the earphone is below a predetermined level and the calling state between the portable telephone and the earphone is detected; and
   generating a warning sound in the earphone if the warning sound signal is received from the portable telephone.

5. The method as claimed in claim 4, further comprising the step of the portable telephone generating the warning sound if the power level of the radio frequency received from the earphone is below the predetermined level in a state that the calling state between the portable telephone and the earphone is not detected.

6. The method as claimed in claim 4, further comprising the step of the portable telephone periodically measuring the power level of the radio frequency received from the earphone when the hands-free mode is determined in the portable telephone.

7. The method as claimed in claim 4, wherein the portable telephone and the earphone perform radio communications according to a BLUETOOTH communications protocol.

8. The method as claimed in claim 4, further comprising the step of generating said warning signal, via said portable telephone, when the distance between the portable telephone and the earphone is greater than a predetermined range and no radio communication exists there between.

9. An apparatus for preventing the loss of a portable telephone, comprising:
   a master communication system provided by said portable telephone and having a short-range radio communication module; and
   a slave communication system provided by a wearable earphone which includes a speaker and a microphone to facilitate hands-free communication, and having another short-range radio communication module which is different from the short-range radio communication module of the master so that the slave performs a Bluetooth communication with the master;
   wherein if it is detected that a distance between the master and the slave is greater than a predetermined range, the master transmits a warning sound signal to the slave to generate a specified warning sound.

* * * * *